US011780686B2

(12) United States Patent
Eisinger

(10) Patent No.: US 11,780,686 B2
(45) Date of Patent: Oct. 10, 2023

(54) TRANSPORT CONTAINER FOR A SORTING DEVICE

(71) Applicant: Interroll Holding AG, Sant' Antonino (CH)

(72) Inventor: Thomas Eisinger, Hückelhoven (DE)

(73) Assignee: Interroll Holding AG, Sant' Antonino (CH)

( * ) Notice: Subject to any disclaimer, the term of this patent is extended or adjusted under 35 U.S.C. 154(b) by 68 days.

(21) Appl. No.: 17/636,905

(22) PCT Filed: Sep. 1, 2020

(86) PCT No.: PCT/EP2020/074333
§ 371 (c)(1),
(2) Date: Feb. 21, 2022

(87) PCT Pub. No.: WO2021/043760
PCT Pub. Date: Mar. 11, 2021

(65) Prior Publication Data
US 2022/0274790 A1  Sep. 1, 2022

(30) Foreign Application Priority Data
Sep. 5, 2019 (DE) .......................... 102019006313.9

(51) Int. Cl.
*B65G 47/96* (2006.01)
*B65G 47/38* (2006.01)
(52) U.S. Cl.
CPC .......... *B65G 47/965* (2013.01); *B65G 47/38* (2013.01); *B65G 47/967* (2013.01); *B65G 2201/0258* (2013.01)
(58) Field of Classification Search
CPC ........ B65G 17/16; B65G 17/18; B65G 47/38; B65G 47/965; B65G 47/967; B65G 2201/0258
See application file for complete search history.

(56) References Cited

U.S. PATENT DOCUMENTS 2,595,689 A * 5/1952 Mitchell ................ B65G 17/48
414/378
5,842,556 A * 12/1998 van Hattum ......... B65G 47/967
198/370.05

(Continued)

FOREIGN PATENT DOCUMENTS

CN        1589220 A     3/2005
CN      108408350 A     8/2018

(Continued)

*Primary Examiner* — Gene O Crawford
*Assistant Examiner* — Keith R Campbell
(74) *Attorney, Agent, or Firm* — Michael Soderman

(57) ABSTRACT

The invention relates to a transport container (4) for a sorting device (1), which can be moved along a conveying path (2), comprising a support frame (6), wherein at least one support tray (8, 10) is rotatably mounted on the support frame, in particular a first support tray (8) and a second support tray (10) following the first support tray (8) in the conveying direction (A) of the transport container (4), wherein the at least one support tray (8, 10) can be rotationally moved by a control device (12) between a substantially horizontal transport position (P1) for transporting a load (L) and a substantially vertical tilt position (P2) for depositing the load (L), wherein the control device (12) has a control lever (14, 16) connected to the support tray, in particular a first control lever (14) connected to the first support tray (8) and a second control lever (16) connected to the second support tray (10), wherein the control lever (14, 16), in particular the respective first control lever (14) and/or second control lever (16), is arranged in the transport position (P1) and/or the tilt position (P2) in a top dead centre position forming a locking position.

1 Claim, 8 Drawing Sheets

(56) References Cited

U.S. PATENT DOCUMENTS

| | | | |
|---|---|---|---|
| 6,193,074 B1 | 2/2001 | Baum et al. | |
| 6,762,382 B1 * | 7/2004 | Danelski | B65G 17/002 |
| | | | 209/912 |
| 7,604,448 B2 * | 10/2009 | Balk | B65G 17/14 |
| | | | 414/331.03 |
| 8,967,938 B2 * | 3/2015 | Cadoret | B65G 65/00 |
| | | | 49/104 |
| 2005/0061614 A1 | 3/2005 | Balk et al. | |
| 2015/0352723 A1 | 12/2015 | Nissler et al. | |
| 2022/0204275 A1 * | 6/2022 | Van Holten | B65G 17/12 |

FOREIGN PATENT DOCUMENTS

| | | | |
|---|---|---|---|
| DE | 3511936 | A1 | 10/1986 |
| DE | 4428841 | C1 | 8/1995 |
| DE | 69611740 | T2 | 11/1996 |
| DE | 19755474 | C1 | 2/1999 |
| DE | 102013200146 | A1 | 7/2014 |
| DE | 102013017314 | A1 | 4/2015 |
| EP | 0391575 | A1 | 10/1990 |
| EP | 2479111 | A2 | 10/2018 |
| FR | 2346259 | A1 | 10/1977 |
| JP | H07304512 | A | 11/1995 |
| JP | H10258929 | A | 9/1998 |
| JP | 2004037437 | A | 2/2004 |

\* cited by examiner

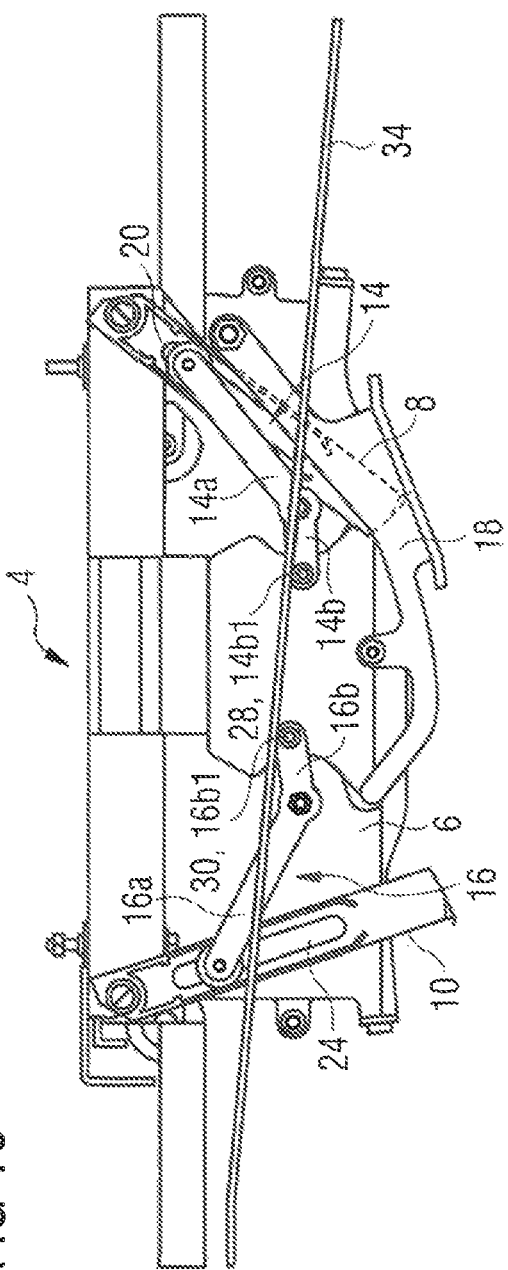
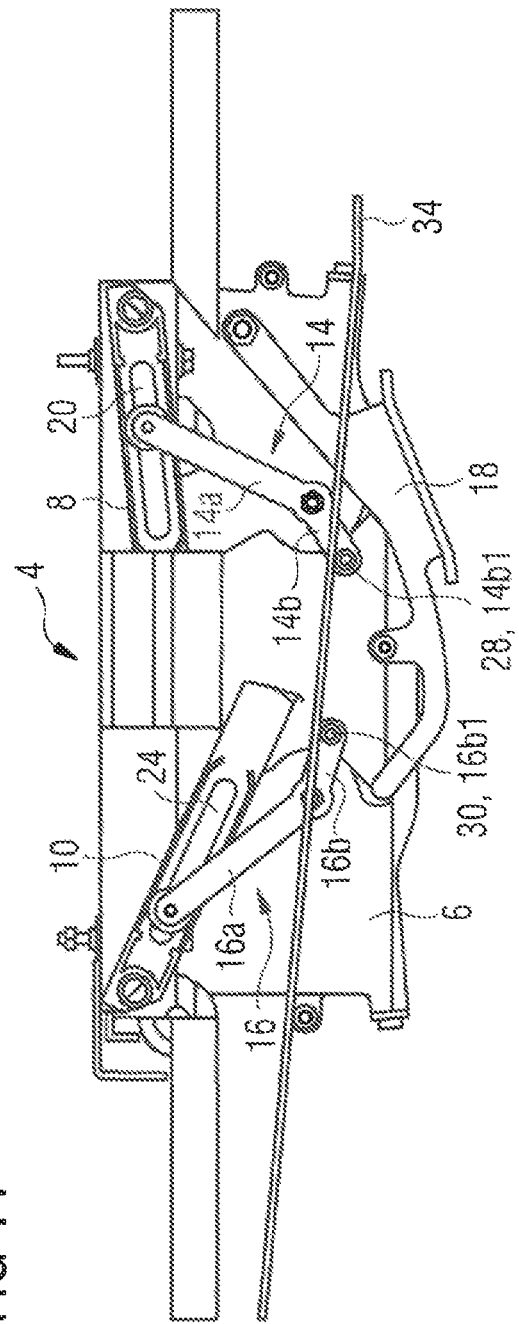

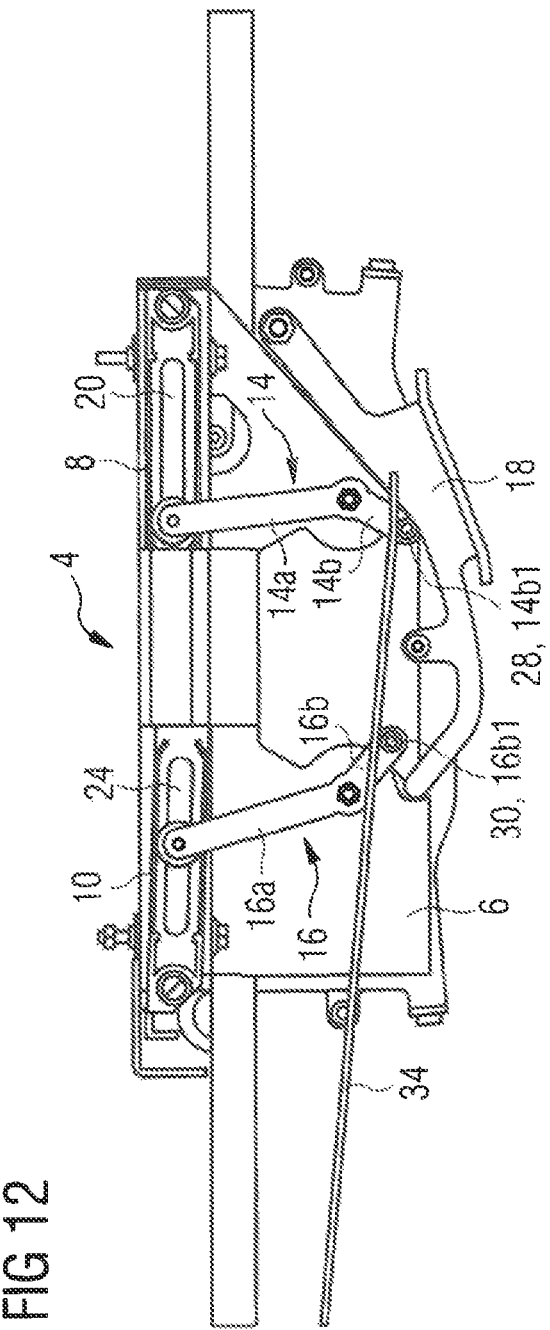
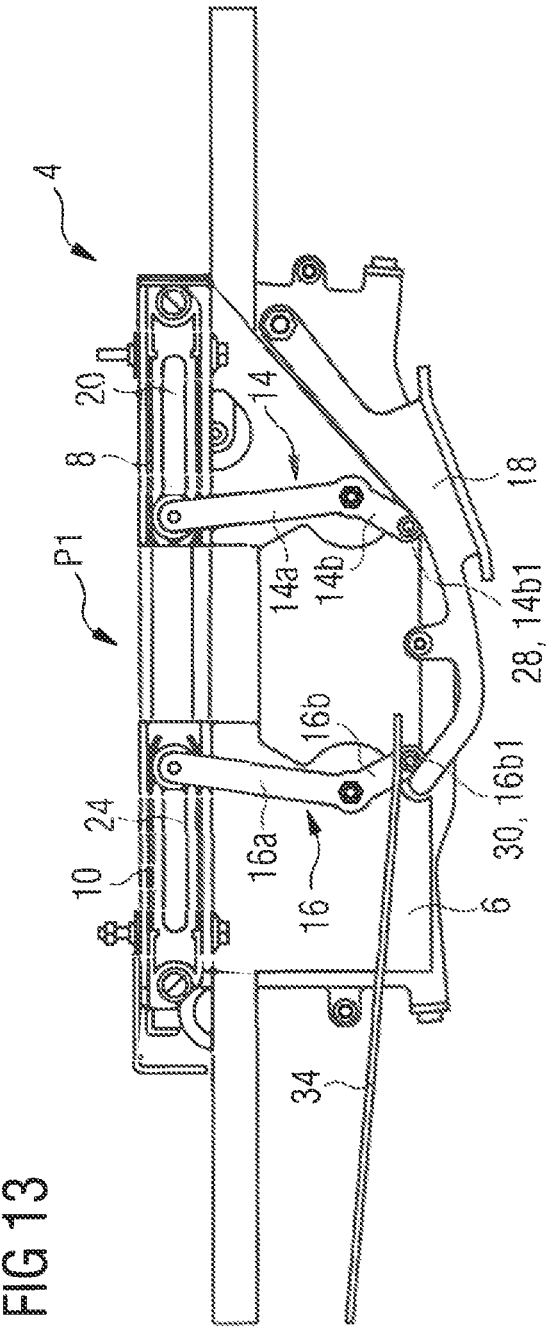

TRANSPORT CONTAINER FOR A SORTING DEVICE

CROSS REFERENCE TO RELATED APPLICATIONS

This application is the U.S. national stage of International Application No. PCT/EP2020/074333, filed on 2020 Sep. 1. The international application claims the priority of DE 102019006313.9 filed on 2019 Sep. 5; all applications are incorporated by reference herein in their entirety.

BACKGROUND

The present invention relates to a transport container for a sorting device. The present invention furthermore relates to a sorting device. The present invention moreover relates to a method for operating a sorting device.

PRIOR ART

So-called split tray sorters, i.e. piece goods sorters, which typically comprise a driven, endless conveyor belt which runs through a closed and in most instances horizontal section along a fixed frame are known as sorting devices for goods. Furthermore, the sorting device is provided with a number of mutually spaced apart transport containers.

The sorting device conventionally interacts with an infeed of the goods to be sorted and a delivery station for dropping off the goods collected in a transport container. Sorting devices of this type are used in distribution systems in which specific batches of goods to be sorted and to be assembled in a specific combination are transported in order to be delivered to specific distribution channels.

Such a split tray sorter can be used for small and light packages or piece goods. A plurality of different opening and closing mechanisms exist for split tray sorters mentioned above. Conventionally, a latch is opened and the halves of the tray drop down while opening. Here, one half of the tray opens in the direction of travel, and the other half of the tray opens counter to the direction of travel. The tray halves are also referred to as carrying trays.

DE 10 2013 017 314 A1 discloses a transport container for a sorting device for goods, said transport container having rotatable flaps. A closed position of the flaps is secured by a locking device.

DE 696 11 740 T2 discloses a device for sorting products having transport elements which are movable along a transport path. Pivotable product carriers can carry a product or, by pivoting, release said product in a downward, targeted manner. The product carrier is held in a horizontal alignment by a locking hook.

Accordingly, there is a demand for refining existing transport containers.

SUMMARY

A transport container for a sorting device is involved here that is displaceable along a conveying track and has a support frame. At least one carrying tray that follows the first carrying tray in the conveying direction of the transport container, is rotatably mounted on the support frame. The at least one carrying tray by an actuating device is rotatable between a substantially horizontal transporting position for transporting a load and a substantially vertical tilting position for dropping off the load. The actuating device has an actuating lever that is connected to the carrying tray, in particular a first actuating lever that is connected to the first carrying tray, and a second actuating lever that is connected to the second carrying tray. The actuating lever, in particular in each case the first actuating lever and/or the second actuating lever, in the transporting position and/or the tilting position is disposed in a dead center position that forms a blocking position.

DETAILED DESCRIPTION

The object is achieved according to the invention by the subject matter of the independent claims. Design embodiments are the subject matter of the dependent claims as well as of the description.

One aspect relates to a transport container for a sorting device that is displaceable along a conveying track and has a support frame on which a first carrying tray and a second carrying tray that follows the first carrying tray in the conveying direction of the transport container are rotatably mounted.

Rotatable can mean that the first carrying tray and the second carrying tray are in each case pivotable about an axis which is disposed so as to be perpendicular to the conveying direction. The conveying direction is the direction in which the transport containers are conveyed and/or conveyable along the conveying track of the sorting device.

The carrying trays by an actuating device are rotatable between a substantially horizontal transporting position for transporting a load and a substantially vertical tilting position for dropping off the load. The actuating device has a first actuating lever that is connected to the first carrying tray, and a second actuating lever that is connected to the second carrying tray. The first actuating lever and/or the second actuating lever in the transporting position and/or the tilting position are/is disposed in a dead center position that forms a blocking position.

In one design embodiment, for transferring the carrying tray from the transporting position into the tilting position, a center of gravity of the carrying tray and/or a center of gravity of an actuating lever connected to the carrying tray is first lifted and subsequently lowered.

In one design embodiment, a possibility for securing the transport container in the transporting position is provided by the present invention. While being displaced along the conveying track, it is to be ensured that the transport container leaves the transporting position and assumes the tilting position, this to date having been guaranteed by separate securing means, for example a securing latch. The present invention represents a simplified securing mechanism which exploits the weight of the participating elements such as the carrying tray (including the weight of the load) or the actuating lever. Therefore, the kinematics are configured so as to be self-securing.

One concept of the present invention lies in providing a transport container for a sorting device in which the first actuating lever and/or the second actuating lever in the transporting position and/or the tilting position can be disposed in a dead center position that forms a blocking position. As a result thereof, securing in relation to the carrying trays being unintentionally opened by a force of the load in the transporting position of the first carrying tray and the second carrying tray can advantageously be enabled.

The dead center position here can mean that, for example when moving the carrying trays out of the transporting position, the carrying trays have to be lifted somewhat in order to release the actuating levers from the blocking position before said carrying trays are able to be moved downward into the tilting position.

Likewise, in order for the carrying trays to be moved out of the tilting position, they first have to be opened somewhat further before said carrying trays are able to be moved upward into the transporting position.

The blocking of the first carrying tray and the second carrying tray in the tilting position advantageously prevents that the carrying trays swing back upon opening. Furthermore, the transport container for the sorting device has a compact actuating device which can be produced in a cost-effective manner and enables some or all of the required functions, i.e. locking, synchronized opening and accelerating of the carrying trays, as well as preventing the carrying trays from overshooting and/or springing back upon opening. Furthermore, a shock resulting from impact can be damped, in particular when opening the carrying trays. Further embodiments of the present invention are the subject matter of the further dependent claims and the description hereunder with reference to the figures.

According to one embodiment it is provided that the actuating device for moving the first actuating lever and the second actuating lever has a trigger lever that is rotatably mounted on the support frame, wherein the first actuating lever and/or the second actuating lever in the transporting position are/is movable from the dead center position that forms a blocking position by the trigger lever. The rotatably mounted trigger lever is thus advantageously capable of moving the actuating levers in the transporting position from the blocking position.

Furthermore, the trigger lever can be configured for moving the first and/or the second actuating lever from the blocking position, thus moving the carrying trays from the transporting position into the tilting position and vice versa.

According to one further embodiment it is provided that the first carrying tray has a first guide element, preferably a guide rail, which for guiding the first actuating lever is aligned in the conveying direction of the transport container, wherein the first actuating lever has a first rolling and/or sliding element which interacts with the first guide element and by way of which the first actuating lever is movable along the first guide element, wherein the second carrying tray has a second guide element, preferably a guide rail, which for guiding the second actuating lever is aligned in the conveying direction of the transport container, and wherein the second actuating lever has a second rolling and/or sliding element which interacts with the second guide element and by way of which the second actuating lever is movable along the second guide element.

The provision of the first carrying tray and the second carrying tray having corresponding guide elements advantageously enables the actuating levers to be guided in the guide elements, on the one hand, as well as the carrying trays to be moved as a function of a predefined motion path of the actuating levers between the transporting position and the tilting position. Furthermore, the guide elements enable a simple implementation of the dead center positions.

According to one further embodiment it is provided that the first actuating lever has a guide portion and an articulation portion which in relation to the guide portion is angled at a predetermined angle of preferably approximately 20° to approximately 50°, more preferably of approximately 30° to approximately 40°, wherein the guide portion is disposed on a longitudinal axial end portion on the first guide portion on the first guide element of the first carrying tray, and wherein the first actuating lever in a connection region of the guide portion and of the articulation portion is rotatably mounted on the support frame.

By providing the first actuating lever with a guide portion and an articulation portion which in relation to the guide portion is angled at the predetermined angle, it can be advantageously enabled that, when deflecting the actuating lever, the first actuating lever in the transporting position as well as in the tilting position of the transport trays can be moved to the desired blocking position when the movement is triggered by the trigger lever. This design embodiment thus simplifies the activation of the actuating lever.

According to one further embodiment it is provided that the second actuating lever has a guide portion and an articulation portion which in relation to the guide portion is angled at a predetermined angle of preferably approximately 20° to approximately 50°, more preferably of approximately 30° to approximately 40°, wherein the guide portion is disposed on a longitudinal axial end portion on the second guide element of the second carrying tray, and wherein the second actuating lever in a connection region of the guide portion and of the articulation portion is rotatably mounted on the support frame.

The provision of the second actuating lever with a guide portion and an articulation portion which in relation to the guide portion is angled at the predetermined angle advantageously enables that, when deflecting the actuating lever, the second actuating lever in the transporting position as well as in the tilting position of the transport trays can be moved to the desired blocking position when the movement is triggered by the trigger lever.

According to one further embodiment it is provided that a third rolling and/or sliding element which is preferably aligned so as to be perpendicular to the articulation portion and is movable along a surface of the trigger lever is disposed on a longitudinal axial end portion of the articulation portion of the first actuating lever, and wherein a fourth rolling and/or sliding element which is preferably aligned so as to be perpendicular to the articulation portion and is movable along a surface of the trigger lever is disposed on a longitudinal axial end portion of the articulation portion of the second actuating lever. By providing the third rolling and/or sliding element as well as the fourth rolling and/or sliding element it can advantageously be enabled that the actuating levers are activated by the trigger lever with little friction and noise.

According to one further embodiment it is provided that the articulation portion of the first actuating lever, preferably the longitudinal axial end portion of the articulation portion, and/or the articulation portion of the second actuating lever, preferably the longitudinal axial end portion of the articulation portion, when the transport container moves past a second trigger element, preferably a closing ramp, by way of the second trigger element are/is deflectable in such a manner that the first actuating lever and the second actuating lever for moving the carrying trays from the tilting position into the transporting position are movable into the dead center position. The closing of the carrying trays of the transport container can thus be advantageously carried out simply by way of an interaction between the actuating levers and the second trigger element.

According to one further embodiment it is provided that the trigger lever, when the transport container moves past a first trigger element, by way of the first trigger element is deflectable in such a manner that the first actuating lever and the second actuating lever for moving the carrying trays from the transporting position into the tilting position by way of the trigger lever are movable, preferably in a synchronized manner, out of the dead center position, and wherein the trigger lever interacts with the first guide element and the second guide element in such a manner that the first actuating lever and the second actuating lever upon overcoming the dead center position are accelerated by a G force of more than 1 g. Alternatively, the carrying trays may also be moved in a somewhat asynchronous manner out of the transporting position, in particular such that the carrying tray which is at the rear in the conveying direction is opened faster and/or earlier than the carrying tray that is at the front in the conveying direction. Because the goods to be dropped off tend to be conveyed further to the rear on the carrying surface as a result of the air stream, such asynchronous opening may be expedient above specific speeds. Asynchronous opening can be achieved, for example, by way of a modified shape of the trigger lever and/or a modified angle between the guide portion and the articulation portion of the second actuating lever.

The preferably synchronous activating and/or moving of the first carrying tray and of the second carrying tray advantageously enables the carrying trays to be uniformly opened such that the goods disposed on the carrying trays can be reliably released and/or reliably dropped off at a predetermined position of the transport container along the conveying track.

Furthermore, by virtue of the interaction between the trigger lever and the first guide elements and the second guide elements, the first actuating lever and the second actuating lever upon overcoming the dead center position can be accelerated by a G force of more than 1 g, thus enabling the carrying trays to be opened more rapidly in comparison to opening the carrying trays while using gravity acting as a result of the dead weight of said carrying trays. For example, the conveying track can be operated at an increased revolving speed by virtue of the carrying trays opening more rapidly, as a result of which the efficiency of the sorting device can be increased.

The trigger lever can have a first contact portion that contacts the first actuating lever and the second actuating lever, and a second contact portion which is disposed so as to be substantially perpendicular to the first contact portion and is able to be activated by the first trigger element.

The function of the first contact portion is to enable the actuating levers by way of the rolling and/or sliding elements thereof to slide and/or roll on the first contact portion. The second contact portion is configured so that said second contact portion is connected to the first trigger element in such a manner that the first trigger element can deflect the trigger lever by contacting the second contact portion.

According to one further embodiment it is provided that the first rolling and/or sliding element of the first actuating lever, and the second rolling and/or sliding element of the second actuating lever, when the carrying trays are moved between the substantially horizontal transporting position and the substantially vertical tilting position by the actuating device, describe a linear movement on the first guide element and on the second guide element, respectively.

The linear movement of the first rolling and/or sliding element and of the second rolling and/or sliding element in and/or along the respective guide elements advantageously enables a guiding movement for the actuating device that is simple and barely prone to malfunctions.

According to one further embodiment it is provided that the first rolling and/or sliding element and/or the second rolling and/or sliding element for damping vibrations and/or noise are/is at least in part configured from an elastomer.

This enables an improved behavior in terms of noise during an operation of the sorting device.

According to one further embodiment it is provided that the trigger lever has a bearing element, preferably a rolling and/or sliding element selected from an elastomer, on which the trigger lever bears in a resting position. The provision of the bearing element thus advantageously enables the trigger lever, by virtue of said trigger lever when not activated bearing on the support frame of the transport container, to have a defined resting position.

According to one further embodiment, the guide portions are configured so as to be elastically deformable, in particular at least in regions so as to be a gas-assisted absorber and/or a spring. This enables vibrations and/or noise to be damped. The deformation capability can in particular be active under tension.

According to one further embodiment it is provided that the articulation portion of the first actuating lever and the articulation portion of the second actuating lever are in each case inclined toward a center of the transport container that is disposed along the conveying direction of the transport container. Such a disposal of the articulation portions of the actuating levers advantageously enables the actuating levers to be able to be moved reliably into the transporting position and/or the tilting position by the trigger lever.

According to one further embodiment it is provided that the first carrying tray by the first actuating lever, and the second carrying tray by the second actuating lever, are movable in a mutually independent manner between the transporting position and the tilting position. This configuration of the actuating device advantageously enables a redundant configuration of the first actuating lever and of the second actuating lever, i.e. any potential malfunction of the first actuating lever or of the second actuating lever does not have any influence on the respective other actuating lever. Furthermore, jamming of the actuating levers during operation by virtue of the connection is thus precluded by virtue of the non-existent connection between the actuating levers.

According to one further embodiment it is provided that the first actuating lever and the second actuating lever are coupled to one another by a coupling element.

This alternative arrangement has the advantage that the actuating device of the transport container is configurable with fewer moving parts since, for the operation of the actuating device, only one actuating lever is required.

According to one embodiment, all of the elements of the actuating device are disposed at a vertical height at which the carrying trays move when opening and closing. This applies to the elements of the actuating device that move conjointly with the carriage, thus, for example, the actuating levers and the trigger lever, and/or to the elements of the actuating device that are disposed on a frame of the sorting device, thus, for example, the first and the second trigger element. The elements can thus be disposed within a lateral extension of the cuboid defined by the movement of the carrying trays, said cuboid forming a dead space. This embodiment is thus configured in a space-saving manner.

One aspect furthermore relates to a sorting device having a conveying track and at least one transport container according to the invention which is displaceable along the conveying track.

One aspect moreover relates to a method for operating a sorting device. The method comprises providing a conveying track and at least one transport container which is displaceable along the conveying track.

The method furthermore comprises providing the transport container having a support frame on which a first carrying tray and a second carrying tray that follows the first carrying tray in the conveying direction of the transport container are rotatably mounted.

The method moreover comprises displacing the transport container along the conveying track, wherein the carrying trays by an actuating device are rotatable between a substantially horizontal transporting position for transporting a load and a substantially vertical tilting position for dropping off the load, wherein the actuating device is provided with a first actuating lever connected to the first carrying tray and with a second actuating lever connected to the second carrying tray, and wherein the first actuating lever and/or the second actuating lever in the transporting position and/or the tilting position are moved into a dead center position that forms a blocking position.

The features of the actuating device described herein can be applied to a multiplicity of different transport containers and/or sorting devices. The carrying trays of the transport container can be embodied, for example, having a single flap per carrying tray as well as two flaps per carrying tray.

BRIEF DESCRIPTION OF THE DRAWINGS

For the purpose of better understanding the present invention and the advantages of the latter, reference now is made to the description hereunder in conjunction with the associated drawings. The invention will be explained in more detail hereunder by means of exemplary embodiments which are set forth in the schematic illustrations of the drawings in which:

FIG. 10 shows a lateral view of the transport container for the sorting device during the closing procedure of the carrying trays of the transport container according to the embodiment;

FIG. 11 shows a lateral view of the transport container for the sorting device during the closing procedure of the carrying trays of the transport container according to the embodiment;

FIG. 12 shows a lateral view of the transport container for the sorting device during the closing procedure of the carrying trays of the transport container according to the embodiment;

FIG. 13 shows a lateral view of the transport container for the sorting device during the closing procedure of the carrying trays of the transport container according to the embodiment;

Unless otherwise stated, the same reference signs identify identical elements of the drawings.

DETAILED DESCRIPTION OF THE PREFERRED EMBODIMENTS

Figure 1:
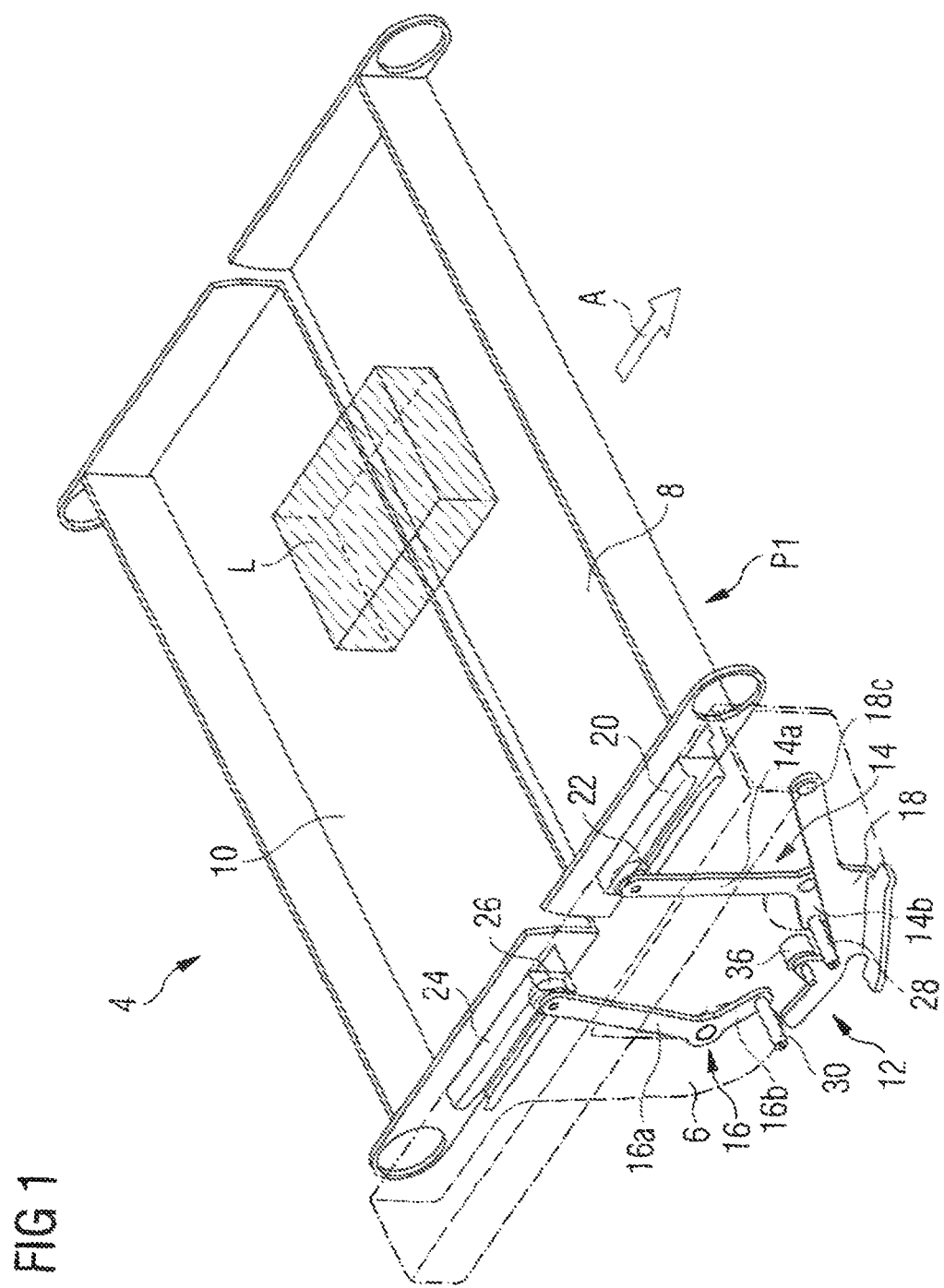
FIG. 1 shows a schematic, perspective illustration of a transport container for a sorting device according to one embodiment.

FIG. 1 shows a schematic, perspective illustration of a transport container 4 for a sorting device according to one embodiment.

The transport container 4 for the sorting device (not shown in FIG. 1) has a support frame 6 on which a first carrying tray 8 and a second carrying tray 10 that follows the first carrying tray 8 in the conveying direction A of the transport container 4 are rotatably mounted.

The carrying trays 8, 10 by an actuating device 12 are rotatably disposed between a substantially horizontal transporting position P1 for transporting a load L, as is illustrated in FIG. 1, and a substantially vertical tilting position P2 for dropping off the load L (the latter not being illustrated in FIG. 1).

A rotation axis of the carrying trays here is disposed on respective opposite longitudinal axial end portions of the carrying trays as well as so as to be perpendicular to the conveying direction.

The actuating device 12 has a first actuating lever 14 connected to the first carrying tray 8, and a second actuating lever connected to the second carrying tray 10. The first actuating lever 14 and the second actuating lever 16 in the transporting position P1 as well as in the tilting position P2 are disposed in a dead center position that forms a blocking position.

Alternatively, only the first actuating lever 14 or the second actuating lever 16 in the transporting position and/or the tilting position may be disposed in the dead center position that forms the blocking position, for example.

The carrying trays 8, 10 in the transporting position P1 for receiving the load configure a contiguous receptacle face which is disposed so as to be substantially horizontal and is substantially closed. Alternatively, the carrying trays 8, 10 in the transporting position P1 for centering the load can configure a substantially V-shaped trough. The carrying trays 8, 10 in the tilting position (not shown in FIG. 1) are furthermore substantially slightly inclined toward a center of the transport container 4 that is disposed along the conveying direction A of the transport container 4.

Figure 2:
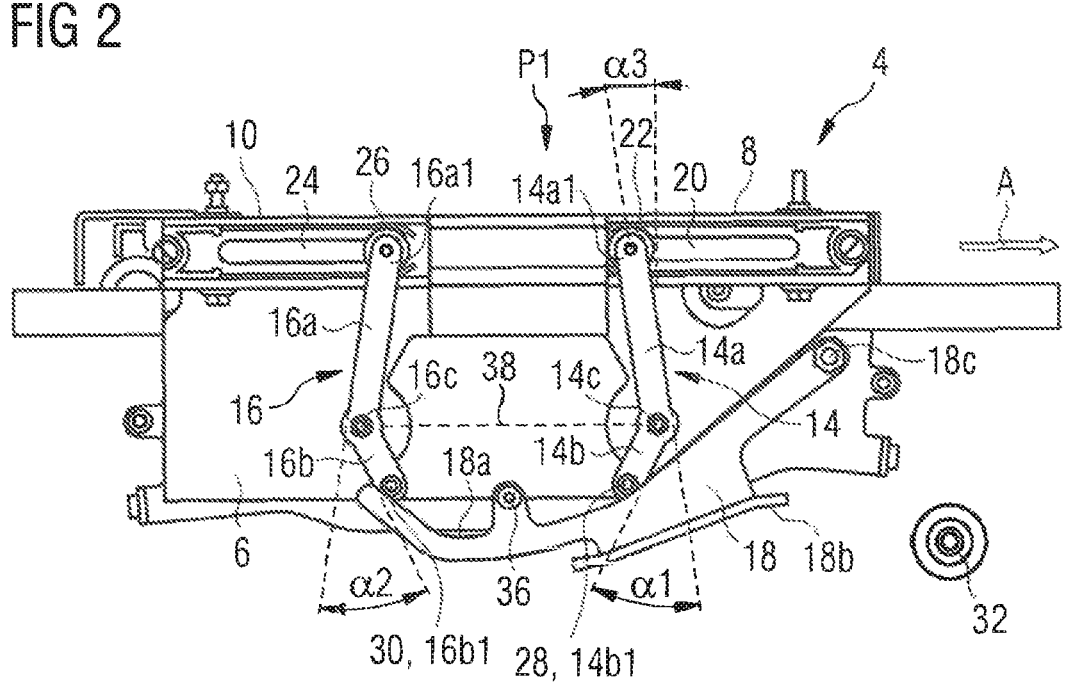
FIG. 2 shows a lateral view of the transport container for the sorting device during an opening procedure of the carrying trays of the transport container according to the embodiment.

FIG. 2 shows a lateral view of the transport container 4 for the sorting device during an opening procedure of the carrying trays of the transport container 4 according to the embodiment.

The actuating device 12 on the support frame 6 has a trigger lever 18 which for moving the first actuating lever 14 and the second actuating lever 16 is rotatably mounted at a bearing point 18c. The first actuating lever 14 and the second actuating lever 16 in the transporting position P1 and the tilting position P2 (not shown in FIG. 2) are movable into the dead center position that forms a blocking position by a trigger lever 18. Alternatively, only the first actuating lever 14 or the second actuating lever 16 in the transporting position P1 and/or the tilting position P2 may be movable into the dead center position that forms the blocking position by the trigger lever 18, for example.

The first carrying tray 8 preferably has a first guide element 20, preferably a guide rail, which for guiding the first actuating lever 14 is aligned approximately in the conveying direction A of the transport container 4. The first actuating lever 14, for example at the upper end thereof, has a first rolling and/or sliding element 22 which interacts with the first guide element 20. The end of the first actuating lever 14 is movable along the first guide element 22 by way of the first rolling and/or sliding element.

Alternatively, the first guide element 20 and/or a second guide element 24 may not be configured as a guide rail, for example, but as a guide groove, channel and/or slot, along which the first rolling and/or sliding element is correspondingly able to be guided.

The second carrying tray 10 has the second guide element 24, preferably a guide rail, which is aligned approximately in the conveying direction A of the transport container 4. The second guide element 24 serves for guiding the second actuating lever 16. The second actuating lever 16, for example at an upper end, has a second rolling and/or sliding element 26 which interacts with the second guide element 24.

The end of the second actuating lever 16 is movable along the second guide element 24 by way of the second rolling and/or sliding element 26.

The first actuating lever 14 has a guide portion 14a and an articulation portion 14b which in relation to the guide portion 14a is angled at a predetermined angle α1 of preferably approximately 20° to approximately 50°, more preferably of approximately 30° to approximately 40°.

The guide portion 14a on a longitudinal axial end portion 14a1 is disposed on the first guide element 20 of the first carrying tray 8. The first actuating lever 14 in a connection region 14c of the guide portion 14a and of the articulation portion 14b is rotatably mounted on the support frame 6.

The second actuating lever 16 has a guide portion 16a and an articulation portion 16b which in relation to the guide portion 16a is angled at a predetermined angle α2 of preferably approximately 20° to approximately 50°, more preferably of approximately 30° to approximately 40°. The guide portion 16a on a longitudinal axial end portion 16a1 is disposed on the second guide element 24 of the second carrying tray 10. The second actuating lever 16 in a connection region 16c of the guide portion 16a and of the articulation portion 16b is rotatably mounted on the support frame 6.

A third rolling and/or sliding element 28 which is preferably aligned so as to be perpendicular to the articulation portion 14b is disposed on a longitudinal axial end portion 14b1 of the articulation portion 14b of the first actuating lever 14. The third rolling and/or sliding element 28 is movable along a surface of the trigger lever 18. The surface of the trigger lever 18 configures a first contact portion 18a.

A fourth rolling and/or sliding element 30 which is preferably aligned so as to be perpendicular to the articulation portion 16b is disposed on a longitudinal axial end portion 16b1 of the articulation portion 16b of the second actuating lever 16. The fourth rolling and/or sliding element 30 is movable along a surface of the trigger lever 18, in particular along the first contact portion 18a of the trigger lever 18.

When the transport container 4 moves past a first trigger element 32, as is described hereunder with reference to FIG. 3 to FIG. 7, the trigger lever 18 by way of the first trigger element 32 is deflectable in such a manner that the first actuating lever 14 and the second actuating lever 16 for moving the carrying trays 8, 10 from the transporting position P1 into the tilting position P2 are movable, preferably in a synchronized manner, out of the dead center position by way of the trigger lever 18.

The trigger lever 18 interacts with the first guide element 20 and the second guide element 24 in such a manner that the first carrying tray 8 and the second carrying tray 10 upon overcoming the dead center position are accelerated by a G force of more than 1 g.

The actuating device 12 is furthermore configured in such a manner that the first rolling and/or sliding element 22 of the first actuating lever 14 on the first guide element 20, and the second rolling and/or sliding element 26 of the second actuating lever 16 on the second guide element 24, when the carrying trays 8, 10 are moved by the actuating device 12 between the substantially horizontal transporting position P1 and the substantially vertical tilting position P2, describe a linear movement.

The first rolling and/or sliding element 22 and the second rolling and/or sliding element 26 for damping vibrations and/or noise are at least in part configured from an elastomer. The trigger lever 18 furthermore has a bearing element 36, preferably a rolling and/or sliding element which is at least in part selected from an elastomer. The trigger lever 18 in the resting position thereof bears on the rolling and/or sliding element configured from elastomer. The resting position of the trigger lever 18 is defined as the position in which the trigger lever 18 is not activated.

The articulation portion 14b of the first actuating lever 14 and the articulation portion 16b of the second actuating lever 16 are in each case inclined toward a center of the transport container 4 that is disposed along the conveying direction A of the transport container 4.

The first carrying tray 8 by the first actuating lever 14, and the second carrying tray 10 by the second actuating lever 16, are movable independently of the respective other actuating lever between the transporting position P1 and the tilting position P2.

In an alternative embodiment, the first actuating lever 14 and the second actuating lever 16 can be coupled to one another by a coupling element 38, as is indicated by dashed lines in FIG. 2.

The actuating device 12 of the transport container 4 in all of the positions, i.e. in the transporting position P1 as well as in the tilting position P2, is disposed within a width, i.e. lateral to the conveying direction, of the transport container 4 and/or within an extent of the transport container 4 in the width direction.

Likewise, the first trigger element 32 (not shown in FIG. 2) as well as the second trigger element 34 are disposed within a width of the transport container 4 and/or a lateral extension of a cuboid that is defined by a movement of the actuating device 12.

In the transporting position P1 shown in FIG. 2, the first actuating lever 14 is disposed in a dead center position, i.e. the guide portion 14a forms a dead center angle α3 in relation to the perpendicular onto the support face of the first carrying tray 8, here in relation to the vertical. The dead center angle α3 can be approximately 2° to approximately 10°, preferably approximately 4° to approximately 7°, particularly preferably approximately 5°. The dead center angle α3 here is sufficiently large so as to guarantee a reliable blocking position in the transporting position P1, on the one hand. On the other hand, said dead center angle α3 is sufficiently small so as to guarantee the opening of the first carrying tray 8 by way of an ideally minor lifting stroke. An ideally minor lifting stroke results in a minor force being developed when opening and/or closing, this in turn leading to ideally little noise being generated.

In an analogous manner, the second actuating lever 16 in the transporting position P1 is also disposed in a dead center position, i.e. the guide portion 16a forms a dead center angle (not plotted) in relation to the perpendicular onto the support face of the second carrying tray 10, here in relation to the vertical. This dead center angle can be dimensioned in the same way as the dead center angle α3. The dead center angles in the tilting position P2 (cf. FIG. 8) can be of identical or similar dimension. The first rolling and/or sliding element 22 and the second rolling and/or sliding element 26 in the transporting position P1 as well as in the tilting position P2 are disposed on the end 30 of the respective guide element 20 and 24, the latter being disposed adjacent to the pivotable end of the respective carrying tray 8, 10. An effective blocking position which prevents the carrying trays 8, 10 being inadvertently pivoted is thus provided by the dead center position.

Figure 3:
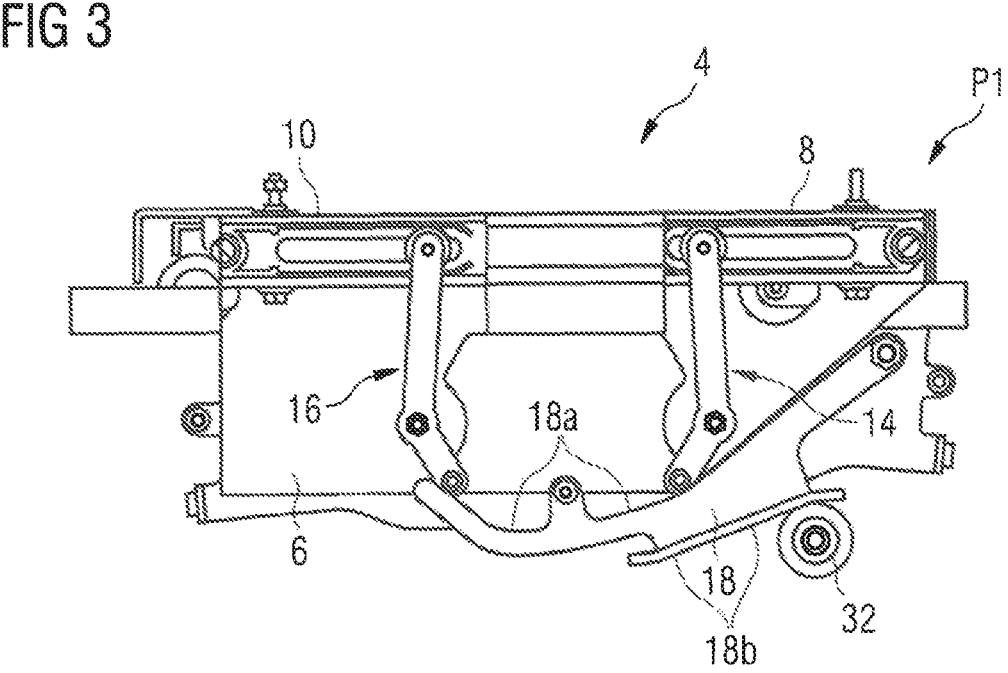
FIG. 3 shows a lateral view of the transport container for the sorting device during the opening procedure of the carrying trays of the transport container according to the embodiment.

FIG. 3 shows a lateral view of the transport container 4 for the sorting device during the opening procedure of the carrying trays of the transport container 4 according to the embodiment.

The first trigger element 32 is disposed so as to be stationary on a frame and in FIG. 3 bears on a second contact portion 18b of the trigger lever 18. The first carrying tray 8 and the second carrying tray 10 of the transport container 4 are slightly raised in relation to the horizontal transporting position P1 (barely visible in the illustration), because the trigger lever 18 presses from below against the third rolling and/or sliding element 28 and the fourth rolling and/or sliding element 30 such that the first rolling and/or sliding element 22 and the second rolling and/or sliding element 26 are moved out of the respective dead center position thereof.

Figure 4:
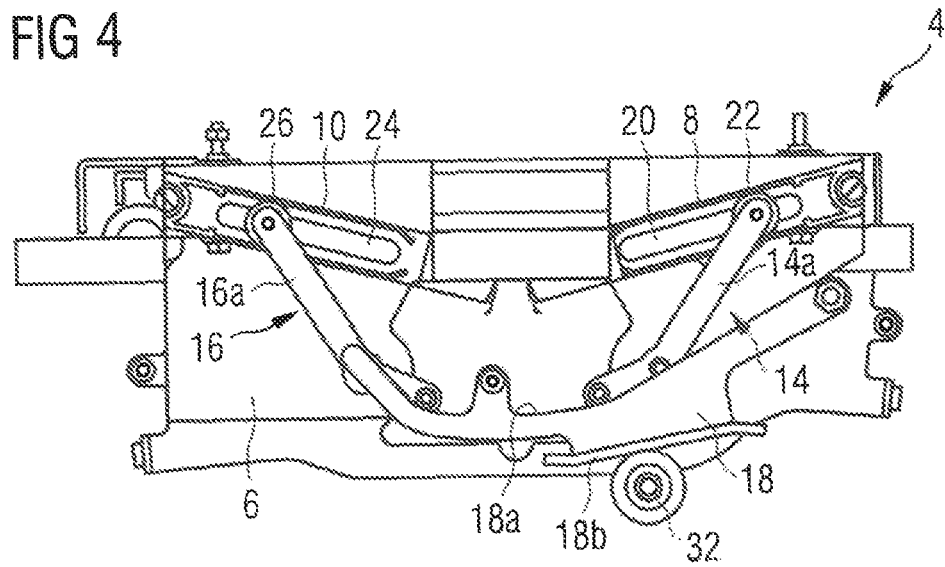
FIG. 4 shows a lateral view of the transport container for the sorting device during the opening procedure of the carrying trays of the transport container according to the embodiment.

FIG. 4 shows a lateral view of the transport container 4 for the sorting device during the opening procedure of the carrying trays of the transport container 4 according to the embodiment.

The first trigger element 32 moves the rotatably mounted trigger lever 18 substantially vertically upward in the direction of the carrying trays 8, 10. This results in a deflection of the first actuating lever 14 and of the second actuating lever 16 by virtue of the movement of the trigger lever 18.

The first rolling and/or sliding element 22 of the first actuating lever 14 here moves from a first longitudinal axial end portion of the first guide element in the direction of a second longitudinal axial end portion of the guide element 20. As a result thereof, the first carrying tray 8 moves out of the substantially horizontal transporting position P1 and in the illustration shown is already slightly inclined downward.

In order for the first carrying tray 8 to be moved out of the substantially horizontal transporting position P1, the first carrying tray 8 by the first actuating lever 14 is moved slightly upward when the first actuating lever 14 is deflected by the trigger lever 18 (cf. FIG. 3), so as to move the first carrying tray 8 out of the dead center position that forms the blocking position, thus releasing the blocking mechanism in the transporting position P1.

Therefore, transferring the carrying tray into the tilting position is possible only once the center of gravity of the carrying tray has been raised to a certain extent. Likewise, the center of gravity of the actuating lever is initially slightly raised. The carrying tray as well as the actuating lever consequently impinge themselves into the transporting position, this having the effect of the transporting position being secured without separate securing means.

In order for the second carrying tray 10 to be moved out of the substantially horizontal transporting position P1, the first carrying tray 10 by the second actuating lever 16, in the deflection of the second actuating lever 16 by the trigger lever 18, is moved slightly upward (cf. FIG. 3), so as to move the second carrying tray 10 out of the dead center position that forms the blocking position, thus releasing the blocking mechanism in the transporting position P1.

Figure 5:
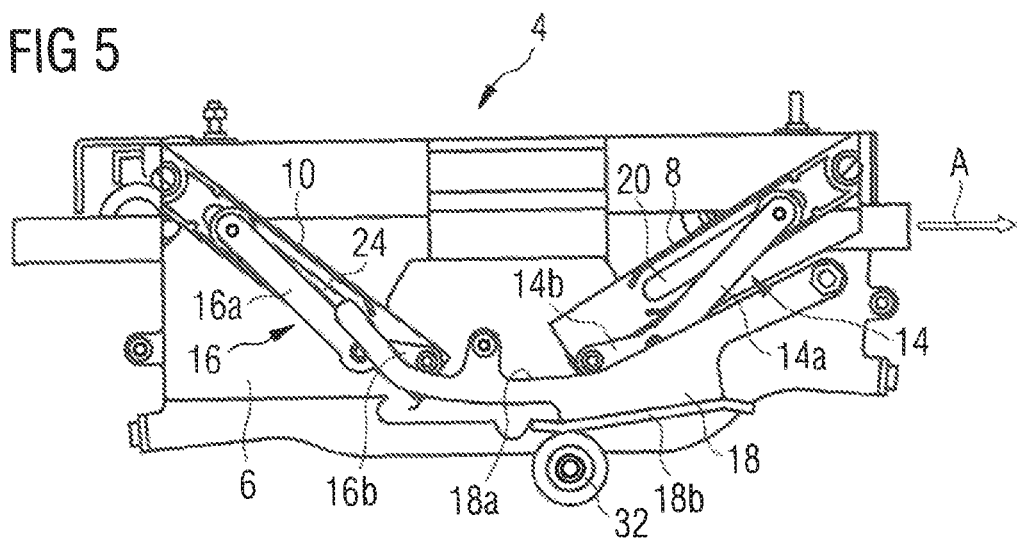
FIG. 5 shows a lateral view of the transport container for the sorting device during the opening procedure of the carrying trays of the transport container according to the embodiment.

FIG. 5 shows a lateral view of the transport container 4 for the sorting device during the opening procedure of the carrying trays of the transport container 4 according to the embodiment.

The first trigger element 32 in the present illustration, by virtue of the movement of the transport container 4 along the conveying direction A, has already reached an end portion of the second contact portion 18b of the trigger lever 18, said end portion being a distal end portion in the conveying direction A. The vertical deflection of the trigger lever 18 is at the maximum in this position of the first trigger element 32.

The first rolling and/or sliding element 22 in the present illustration has reached a longitudinal axial end portion of the first guide element 20, wherein the first carrying tray 8 by way of the impulse generated by the first actuating lever 14 now moves in the direction of the tilting position P2 of the first carrying tray 8.

Likewise, the second rolling and/or sliding element 26 in the present illustration 30 has reached a longitudinal axial end portion of the second guide element 24, wherein the second carrying tray 10 by way of the impulse generated by the second actuating lever now moves in the direction of the tilting position P2 of the second carrying tray 10.

Figure 6:
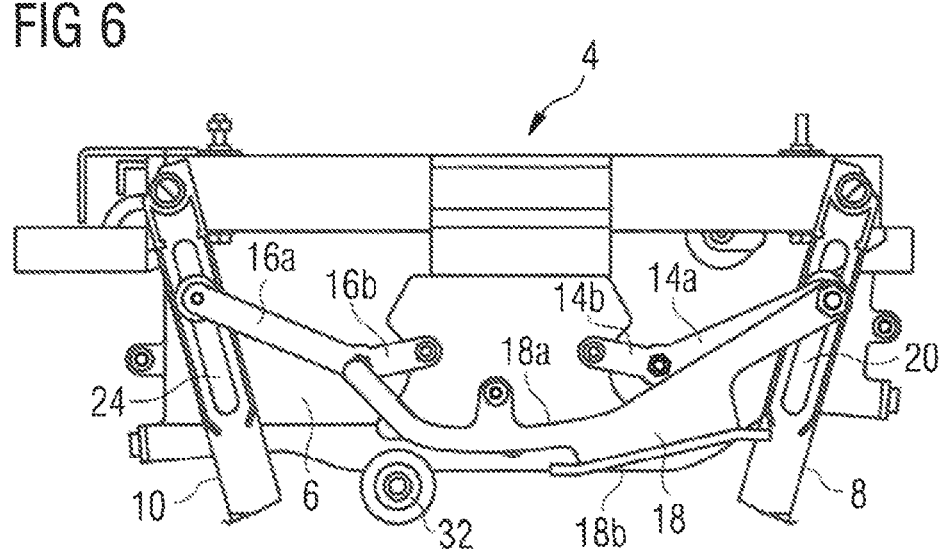
FIG. 6 shows a lateral view of the transport container for the sorting device during the opening procedure of the carrying trays of the transport container according to the embodiment.

FIG. 6 shows a lateral view of the transport container 4 for the sorting device during the opening procedure of the carrying trays of the transport container 4 according to the embodiment.

The first trigger element 32 in the present illustration has moved beyond an axial end portion of the trigger lever 18, wherein the trigger lever 18 up to this point in time remains substantially in the previous position thereof or, optionally, is deflected slightly downward as a result of gravity. The first carrying tray 8 and the second carrying tray 10 are largely opened.

By virtue of the almost vertical position of the carrying trays 8, 10, and because the guide portions 14a, 16a are configured so as to be longer than the articulation portions 14b, 16b, the actuating levers 14, 16 again as a result of gravity now move along the respective guide elements 20, 24 of the actuating levers 14, 16 in the direction of the opposite longitudinal axial end portion of the guide elements 20, 24, the latter here being the lower end portion.

Figure 7:
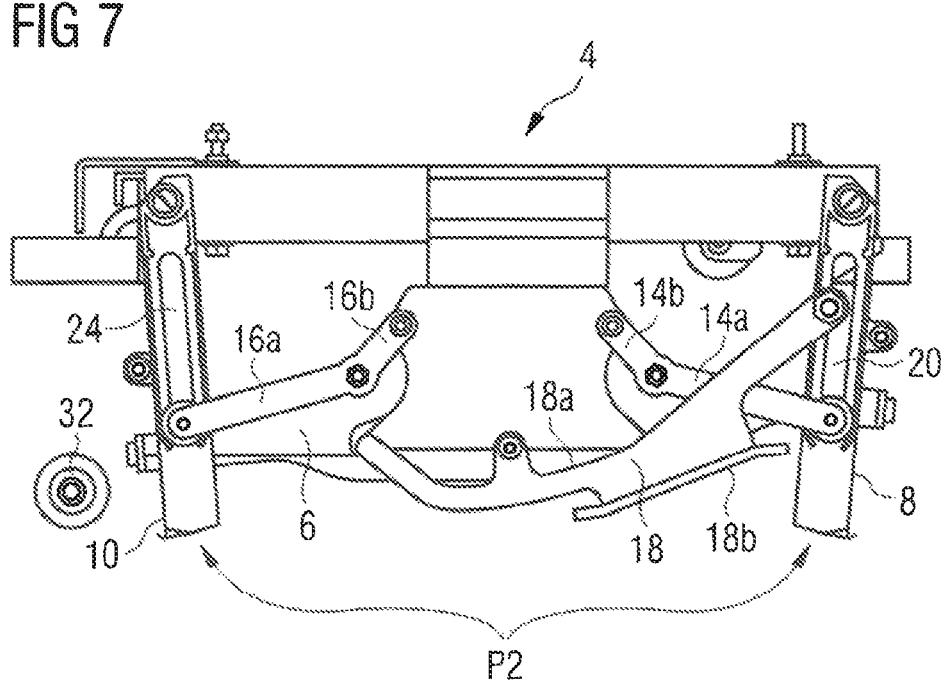
FIG. 7 shows a lateral view of the transport container for the sorting device during the opening procedure of the carrying trays of the transport container according to the embodiment.

FIG. 7 shows a lateral view of the transport container 4 for the sorting device during the opening procedure of the carrying trays of the transport container 4 according to the embodiment.

In the present illustration, the transport container 4 has completely moved past the first trigger element 32. The first carrying tray 8 and the second carrying tray 10 in the following illustration are shown in the tilting position P2. The first carrying tray 8 and the second carrying tray 10 in the tilting position P2 are disposed so as to be substantially almost vertical and/or substantially almost perpendicular to the conveying direction A of the transport container 4.

The first actuating lever 14 and the second actuating lever 16 here, by way of the respective rolling and/or sliding elements 22, 26 thereof, are disposed on the axial end portions of the guide elements 20, 24. In the tilting position P2 of the first carrying tray 8 and of the second carrying tray 10, said axial end portions are as a result of gravity in each case the lower axial end portions of the first guide element 20 and of the second guide element 24.

The first guide element 22 and the second guide element 26 in the transporting position P1 are disposed on those ends of the guide elements 20, 24 that are spaced apart from the rotation axis of the respective associated carrying tray 8, 10. While the carrying trays 8, 10 open, the first guide element 22 and the second guide element 26 in the guide elements 20, 24 are first moved toward the respective associated rotation axis and subsequently moved away therefrom again. In the tilting position P2, the rolling and/or sliding elements 22, 26 are again disposed on those ends of the guide elements 20, 24 that are spaced apart from the rotation axis of the respective associated carrying tray 8, 10.

The first guide element 22 and the second guide element 26 in the guide elements 20, 24 are first moved toward the respective associated rotation axis and subsequently moved away therefrom again also while the carrying trays 8, 10 close.

In the transporting position P1, the rolling and/or sliding elements 22, 26 are again disposed on those ends of the guide elements 20, 24 that are spaced apart from the rotation axis of the respective associated carrying tray 8, 10.

Figure 8:
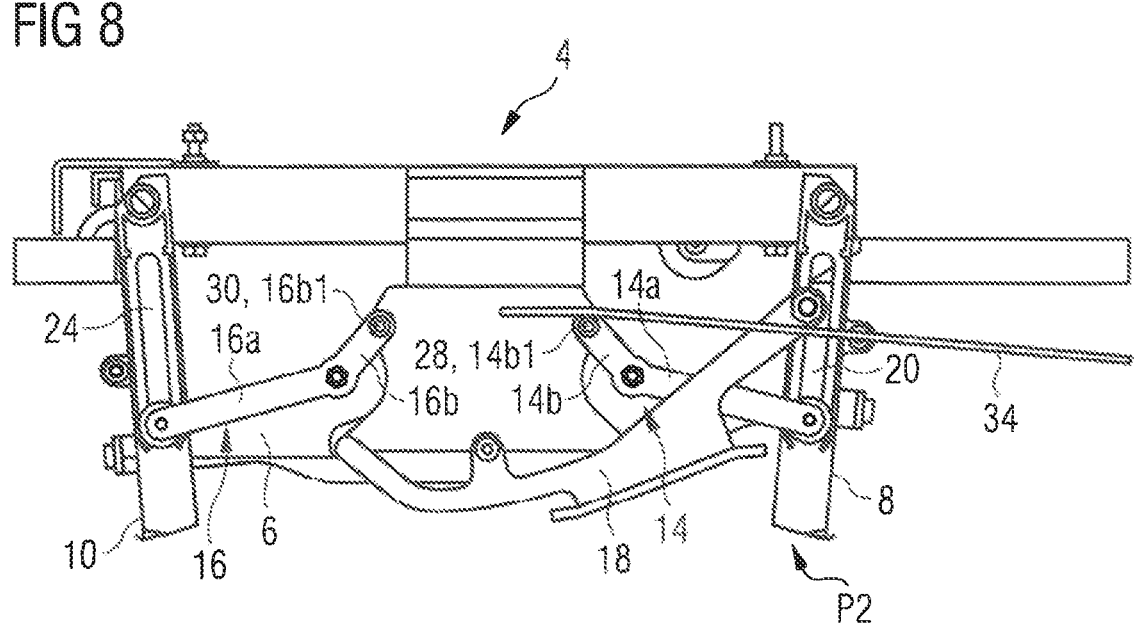
FIG. 8 shows a lateral view of the transport container for the sorting device during a closing procedure of the carrying trays of the transport container according to the embodiment.

FIG. 8 to FIG. 13 show a lateral view of the transport container 4 for the sorting device during a closing procedure of the carrying trays of the transport container 4 according to the embodiment. The transport container in FIG. 8 is disposed in the tilting position P2.

The longitudinal axial end portion 14b1 of the articulation portion 14b of the first actuating lever 14, and the longitudinal axial end portion 16b1 of the articulation portion 16b of the second actuating lever 16, when the transport container 4 moves past a second stationary trigger element 34, preferably a closing ramp, by way of the second trigger element 34 are deflectable in such a manner that the first actuating lever 14 and the second actuating lever 16 are movable in order for the carrying trays 8, 10 to be moved from the tilting position P2 into the transporting position P1.

In order to be moved out of the tilting position of the first carrying tray 8 and of the second carrying tray 10 shown in FIG. 8, the dead center position of the first carrying tray 8 and of the second carrying tray 10 that forms the blocking position is first released by way of an interaction of the first actuating lever 14 and the second actuating lever 16 with the second trigger element 34.

The second trigger element 34 in the situation shown in FIG. 8 already contacts the first actuating lever 14 and thus causes the latter to be moved and/or deflected.

Figure 9:
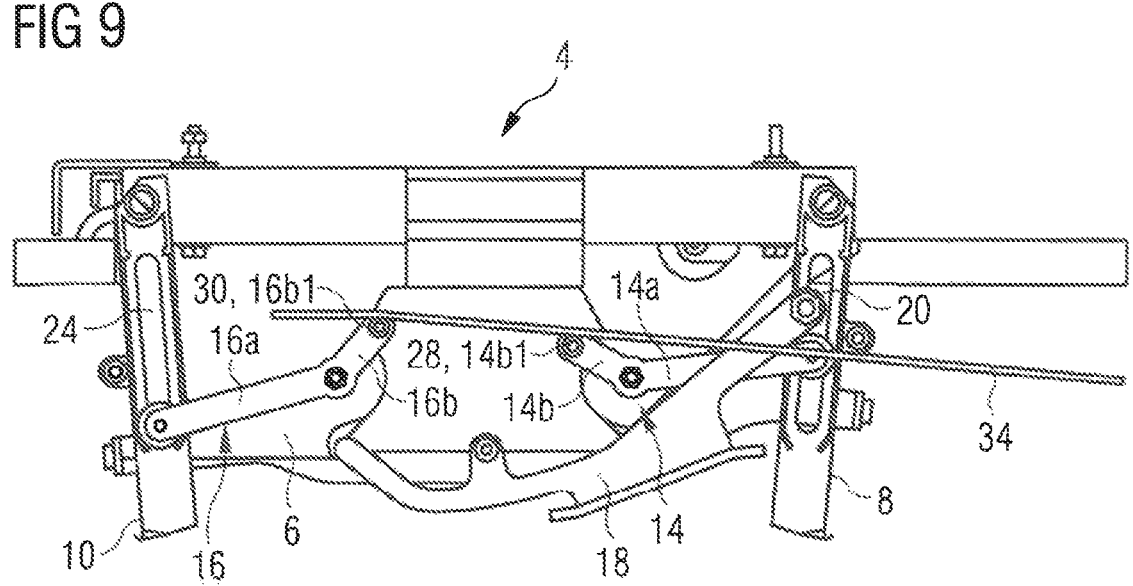
FIG. 9 shows a lateral view of the transport container for the sorting device during the closing procedure of the carrying trays of the transport container according to the embodiment.

FIG. 9 shows a lateral view of the transport container 4 for the sorting device during the closing procedure of the carrying trays of the transport container 4 according to the embodiment.

In the situation shown in FIG. 9, the second trigger element 34 contacts the articulation portion 14b of the first actuating lever 14 and the articulation portion 16b of the second actuating lever 16, thus causing the deflection of the first actuating lever 14 and of the second actuating lever 16 out of the tilting position P2 of the first carrying tray 8 and of the second carrying tray 10 in the direction of the transporting position P1 to commence.

The second actuating lever 16 here is disposed approximately at the dead center thereof in the guide element 24, while the first actuating lever 14 has already moved out of the blocking position beyond the dead center thereof.

FIG. 10 shows a lateral view of the transport container 4 for the sorting device during the closing procedure of the carrying trays of the transport container 4 according to the embodiment.

In the present illustration, the first actuating lever 14 and the second actuating lever 16 have already been further deflected, and a movement of the first carrying tray 8 and of the second carrying tray 10 of the transport container 4 in the direction of the transporting position P1 can be seen.

By virtue of the asynchronous and/or temporally offset deflection of the first actuating lever 14 and of the second actuating lever 16, caused by the geometry of the second trigger element 34, a likewise asynchronous and/or temporally offset deflection of the first actuating lever 14 and of the second actuating lever 16 takes place, this in turn causing an asynchronous and/or temporally offset deflection and/or movement of the first carrying tray 8 and of the second carrying tray 10.

The first carrying tray 8 here in terms of the motion sequence thereof has already progressed somewhat further than the second carrying tray 10 which has been triggered and/or activated later and/or subsequently.

FIG. 11 shows a lateral view of the transport container 4 for the sorting device during the closing procedure of the carrying trays 8, 10 of the transport container 4 according to the embodiment.

In the present illustration, the first rolling and/or sliding element 22 of the first actuating lever 14 has already moved largely in the direction of the opposite longitudinal axial end portion of the first guide element 20.

Likewise, the second rolling and/or sliding element 26 of the second actuating lever 16 has already moved largely in the direction of the opposite longitudinal axial end portion of the second guide element 24.

FIG. 12 shows a lateral view of the transport container 4 for the sorting device during the closing procedure of the carrying trays 8, 10 of the transport container 4 according to the embodiment.

In the illustration shown, the second trigger element 34 by way of the longitudinal axial end portion thereof has reached the third rolling and/or sliding element 28 of the articulation portion 14b of the first actuating lever 14. The first carrying tray 8 in the present illustration has reached approximately the end position thereof, i.e. in the transporting position P1.

The second carrying tray 10, by virtue of the slightly temporally offset activation, is not yet completely disposed in the tilting position P2. This is caused inter alia by the geometry of the second trigger element 34.

FIG. 13 shows a lateral view of the transport container 4 for the sorting device during the closing procedure of the carrying trays 8, 10 of the transport container 4 according to the embodiment. In the illustration shown, the first carrying tray 8 as well as the second carrying tray 10 are disposed in the transporting position P1. The second trigger element 34 in the present illustration has already passed the articulation portion 14b of the first actuating lever 14, and by way of the longitudinal axial end portion thereof, i.e. by way of the longitudinal axial end portion of the second trigger element 34, is disposed in the region of the articulation portion 16b of the second actuating lever 16.

The first carrying tray 8 as well as the second carrying tray 10 in the illustration shown are disposed in the dead center position of the transporting position P1 that forms the blocking position.

Figure 14:
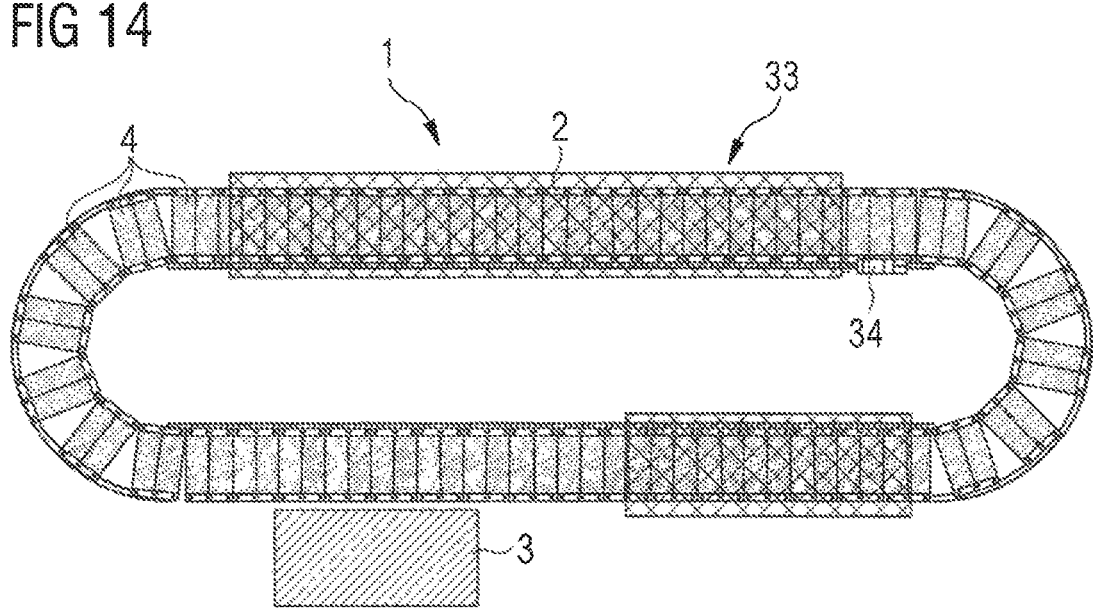
FIG. 14 shows a schematic illustration of a sorting device for the transport container according to the invention and according to the embodiment.

FIG. 14 shows a schematic illustration of a sorting device for the transport container according to the invention and according to the embodiment. The sorting device 1 has a conveying track 2 which is configured in the form of an endless loop and along which a multiplicity of transport containers 4 which are in each case disposed so as to be mutually adjacent are used. An infeed portion 3 for filling the transport containers 4 with goods is situated at a predefined position beside the conveying track 2.

A drop-off zone 33 in which the transport containers drop off the respective filled load by opening the carrying trays 8, 10 is disposed on a second predefined portion of the conveying track 2. The second trigger element 34 is disposed so as to adjoin the drop-off zone 33, wherein the closing of the first carrying tray 8 and of the second carrying tray 10 from the tilting position P2 into the transporting position P1 is effected by moving the transport containers 4 past the second trigger element 34.

The first trigger element 32 (not shown in FIG. 14) by an actuator (not shown in FIG. 14) is moved into a travel path of the trigger lever 18 of the transport container 4 so as to open the transport container 4 at a correspondingly designated position along the conveying track 2. Upon opening and/or triggering of the trigger lever 18, the first trigger element 32 by the actuator is again moved out of the travel path of following transport containers 4.

Figure 15:
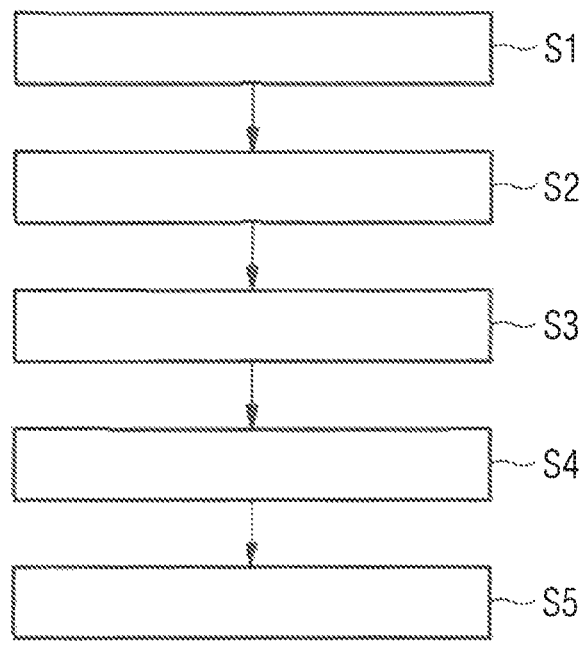
FIG. 15 shows a flow chart of a method for operating the sorting device according to the embodiment.

FIG. 15 shows a flow chart of a method for operating the sorting device according to the embodiment.

The method comprises providing S1 a conveying track 2 and at least one transport container 4 which is displaceable along the conveying track 2.

The method furthermore comprises providing S2 the transport container 4 having a support frame 6 on which a first carrying tray 8 and a second carrying tray 10 that follows the first carrying tray 8 in the conveying direction A of the transport container 4 are rotatably mounted.

The method furthermore comprises displacing S3 the transport container 4 along the conveying track 2, wherein the carrying trays 8, 10 by an actuating device 12 are rotatable between a substantially horizontal transporting position P1 for transporting a load L and a substantially vertical tilting position P2 for dropping off the load L, wherein the actuating device 12 is provided S4 with a first actuating lever 14 connected to the first carrying tray 8, and with a second actuating lever 16 connected to the second carrying tray 10, and wherein the first actuating lever 14 and/or the second actuating lever 16 in the transporting position P1 and/or the tilting position P2 are/is moved S5 into a dead center position that forms a blocking position.

While specific embodiments have been illustrated and described herein, it is obvious to the person skilled in the art that a multiplicity of alternatives and/or equivalent implementations exist. It should be noted that the exemplary embodiment or exemplary embodiments are merely examples and are not intended to limit the scope, the applicability or the configuration in any way.

Rather, the above summary and detailed description offers the person skilled in the art a comfortable set of instructions for implementing at least an exemplary embodiment, wherein it is understood that various modifications in terms of the scope of the functions and the disposal of the elements can be performed without deviating from the scope of the appended claims and the legal equivalents thereof.

This application is generally intended to cover modifications and/or adaptations or variations of the embodiments set forth herein.

LIST OF REFERENCE NUMERALS

1 Sorting device
2 Conveying track
3 Infeed portion
4 Transport container
6 Support frame
8 First carrying tray
10 Second carrying tray
12 Actuating device
14 First actuating lever
14a Guide portion
14a1 Longitudinal axial end portion
14b Articulation portion
14b1 Longitudinal axial end portion
14c Connection region
16 Second actuating lever
16a Guide portion
16a1 Longitudinal axial end portion
16b Articulation portion
16b1 Longitudinal axial end portion
16c Connection region
18 Trigger lever
18a First contact portion
18b Second contact portion
18c Bearing point
20 First guide element
22 First rolling and/or sliding element
24 Second guide element
26 Second rolling and/or sliding element
28 Third rolling and/or sliding element
30 Fourth rolling and/or sliding element
32 First trigger element
33 Drop zone
34 Second trigger element
36 Bearing element
38 Coupling element
◻1 Angle
◻2 Angle
◻3 Dead center angle
A Conveying direction
L Load
P1 Transporting position
P2 Tilting position
S1 Method step
S2 Method step
S3 Method step
S4 Method step
S5 Method step

The invention claimed is:

1. A method for operating a sorting device (1) comprising the following steps:
   providing a transport container (4) having a support frame (6) that is displaceable along a conveying track (2), rotating at least one first carrying tray (8) and a second carrying tray (10) that follows the first carrying tray (8) in the conveying direction (A) of the transport container (4) on the support frame, rotating the at least one carrying tray (8, 10) via an actuating device (12) between a substantially horizontal transporting position (P1) for transporting a load (L) and a substantially vertical tilting position (P2) for dropping off the load (L), characterized in that, for transferring the carrying tray from the transporting position (P1) into the tilting position, a center of gravity of the carrying tray (8) and/or a center of gravity of an actuating lever (14, 16) connected to the carrying tray is first lifted and subsequently lowered.

\* \* \* \* \*